United States Patent
Vaid et al.

(10) Patent No.: US 11,216,247 B2
(45) Date of Patent: Jan. 4, 2022

(54) AUTOMATIC ASSET ANOMALY DETECTION IN A MULTI-SENSOR NETWORK

(71) Applicant: Oracle International Corporation, Redwood Shores, CA (US)

(72) Inventors: Amit Vaid, Bengaluru (IN); Karthik Gvd, Bengaluru (IN); Vijayalakshmi Krishnamurthy, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 50 days.

(21) Appl. No.: 16/806,275

(22) Filed: Mar. 2, 2020

(65) Prior Publication Data

US 2021/0271449 A1    Sep. 2, 2021

(51) Int. Cl.
G06F 7/02    (2006.01)

(52) U.S. Cl.
CPC ...................... *G06F 7/02* (2013.01)

(58) Field of Classification Search
CPC ........................................... G06F 7/02
See application file for complete search history.

(56) References Cited

U.S. PATENT DOCUMENTS 7,743,086 B2    6/2010  Hu et al.
8,495,060 B1    7/2013  Chang
(Continued)

FOREIGN PATENT DOCUMENTS

CN    107493277 A    12/2017
CN    110967690 A    4/2020
(Continued)

OTHER PUBLICATIONS

Andrea Giantomassi, Electric Motor Fault Detection and Diagnosis by Kernel Density Estimation and Kullback-Leibler Divergence based on Stator Current Measurements, 11 pages, printed Mar. 4, 2021 (Year: 2021).

(Continued)

*Primary Examiner* — Henry Tsai
*Assistant Examiner* — John B Roche
(74) *Attorney, Agent, or Firm* — Potomac Law Group, PLLC

(57) ABSTRACT

Embodiments determine anomalies in sensor data generated by a plurality of sensors that correspond to a single asset. Embodiments receive a first time window of clean sensor input data generated by the sensors, the clean sensor data including anomaly free data comprised of clean data points. Embodiments divide the clean data points into training data points and evaluation data points, and divide the training data points into a pre-defined number of plurality of segments of equal length. Embodiments convert each of the plurality of segments into corresponding segment curves using Kernel Density Estimation ("KDE") and determine a Jensen-Shannon ("JS") divergence value for each of the plurality of segments using the segment curves to generate a plurality of JS divergence values. Embodiments then assign the maximum value of the plurality of JS divergence values as a threshold value and validate the threshold value using the evaluation data points.

20 Claims, 7 Drawing Sheets

(56) References Cited

U.S. PATENT DOCUMENTS

| | | | |
|---|---|---|---|
| 9,160,760 | B2 | 10/2015 | Vasseur et al. |
| 9,336,493 | B2 | 5/2016 | Lee et al. |
| 2010/0012161 | A1 | 1/2010 | Classen et al. |
| 2012/0166142 | A1 | 6/2012 | Maeda et al. |
| 2013/0318011 | A1 | 11/2013 | Jones et al. |
| 2015/0189068 | A1 | 7/2015 | Mohan et al. |
| 2015/0223309 | A1 | 8/2015 | Mohan et al. |
| 2015/0363699 | A1 | 12/2015 | Nikovski et al. |
| 2016/0004237 | A1 | 1/2016 | Mohan et al. |
| 2016/0217378 | A1 | 7/2016 | Bellala et al. |
| 2016/0285913 | A1 | 9/2016 | Itskin et al. |
| 2016/0328253 | A1 | 11/2016 | Majumdar |
| 2016/0356633 | A1 | 12/2016 | Mohan et al. |
| 2017/0177812 | A1* | 6/2017 | Sjolund .............. A61N 5/103 |
| 2017/0192098 | A1 | 7/2017 | Cho |
| 2018/0039555 | A1 | 2/2018 | Salunke et al. |
| 2018/0177415 | A1* | 6/2018 | Madl ............... A61B 5/02405 |
| 2018/0211176 | A1 | 7/2018 | Khurshudov et al. |
| 2018/0268264 | A1 | 9/2018 | Marwah et al. |
| 2018/0365136 | A1 | 12/2018 | Kumar et al. |
| 2019/0138423 | A1 | 5/2019 | Agerstam et al. |
| 2020/0050825 | A1* | 2/2020 | Mendoza-Schrock ..................... G06K 9/0063 |
| 2021/0095996 | A1* | 4/2021 | Gvd ....................... G01D 1/00 |

FOREIGN PATENT DOCUMENTS

| | | |
|---|---|---|
| WO | 2009046185 A2 | 4/2009 |
| WO | 2018025008 A1 | 2/2018 |
| WO | 2019019429 A1 | 1/2019 |

OTHER PUBLICATIONS

Bjorn Barz, Detecting Regions of Maximal Divergence for Spatio-Temporal Anomaly Detection, May 2019, 14 pages (Year: 2019).

Fukumizu, Robust Kernel Density Estimation, 2012 JooSeuk Kim and Clayton D. Scott. 37 Pages (Year: 2012).

Hiroaki Sasaki, Direct Density-Derivative Estimation and Its Application in KL-Divergence Approximation, 12 pages, Jun. 30, 2014 (Year: 2014).

Kevin R. Moon, Ensemble Estimation of Information Divergence, 39 pages, 2018 (Year: 2018).

Xie, Distributed Segment-Based Anomaly Detection With Kullback-Leibler Divergence in Wireless Sensor Networks, IEEE Transactions on Information Forensics and Security, vol. 12, No. 1, Jan. 2017, 10 pages (Year: 2017).

U.S. Appl. No. 16/585,764, filed Sep. 27, 2019, Karthik GVD.

Afgani et al., "Anomaly Detection Using The Kullback-Leibler Divergence Metric", https://www.researchgate.net/publication/224369692_Anomaly_Detection_Using_The_Kullback-Leibler_Divergence Metric, last downloaded Apr. 15, 2019.

Cao et al., "SOMKE: Kernel Density Estimation Over DataStreams by Sequences of Self-Organizing Maps", IEEE Transactions on Neural Networks and Learning Systems, vol. 23, No. 8, Aug. 2012, http://www.bme.ele.uri.edu/faculty/he/PDFfiles/somke.pdf.

Cortes, "Variable Weight Kernel Density Estimation", a dissertation submitted in partial fullfillment of the requirements for the degree of Doctor of Philosophy in the University of Michigan, 2017.

Filippone et al., "Information Theoretic Novelty Detection", Technical Report CS-09-02, Feb. 2009, pp. 1-23, http://www.dcs.gla.ac.uk/~maurizio/Publications/tech_rep_info_theo09.pdf.

Kim et al., "Robust Kernel Density Estimation", Journal of Machine Learning Research 13 (2012) 2529-2565, Published Sep. 2012.

Xie et al., "Distributed Segment-Based Anomaly Detection With Kullback-Leibler Divergence in Wireless Sensor Networks", https://www.researchgate.net/publication/307438982_Distributed_Segment-Based_Anomaly_Detection_With_Kullback-Leibler_Divergence_in_Wireless_Sensor_Networks, last downloaded Apr. 12, 2019.

Youssef et al., "An optimal fault detection threshold for early detection using Kullback-Leibler Divergence for unknown distribution data", ScienceDirect, Signal Processing, vol. 120, Mar. 2016, pp. 266-279.

\* cited by examiner

AUTOMATIC ASSET ANOMALY DETECTION IN A MULTI-SENSOR NETWORK

FIELD

One embodiment is directed generally to anomaly detection, and in particular to anomaly detection in a sensor network.

BACKGROUND INFORMATION

The Internet of Things ("IoT") is the extension of Internet connectivity into physical devices and everyday objects. Embedded with electronics, Internet connectivity, and sensors, these devices can communicate and interact with others over the Internet, and they can be remotely monitored and controlled.

However, within the IoT, anomaly in measurements of assets by sensors may occur due to sensor failure, abnormal changes of the monitored assets or environments, etc. As the number of devices that may be connected exceeds millions or even billions, automatic, accurate and efficient anomaly detection becomes increasingly important.

SUMMARY

Embodiments determine anomalies in sensor data generated by a plurality of sensors that correspond to a single asset. Embodiments receive a first time window of clean sensor input data generated by the sensors, the clean sensor data including anomaly free data comprised of clean data points. Embodiments divide the clean data points into training data points and evaluation data points, and divide the training data points into a pre-defined number of plurality of segments of equal length. Embodiments convert each of the plurality of segments into corresponding segment curves using Kernel Density Estimation ("KDE") and determine a Jensen-Shannon ("JS") divergence value for each of the plurality of segments using the segment curves to generate a plurality of JS divergence values. Embodiments then assign the maximum value of the plurality of JS divergence values as a threshold value and validate the threshold value using the evaluation data points.

DETAILED DESCRIPTION

Embodiments provide anomaly detection of sensor data for an asset that is monitored using multiple sensors. The anomaly detection includes automatically determining a threshold used to filter out potential anomalies. Embodiments utilize Kernel Density Estimation ("KDE") in combination with Jensen-Shannon ("JS") divergence to both determine the threshold and then determine anomalies in a stream of incoming multi-sensor data.

Figure 1:
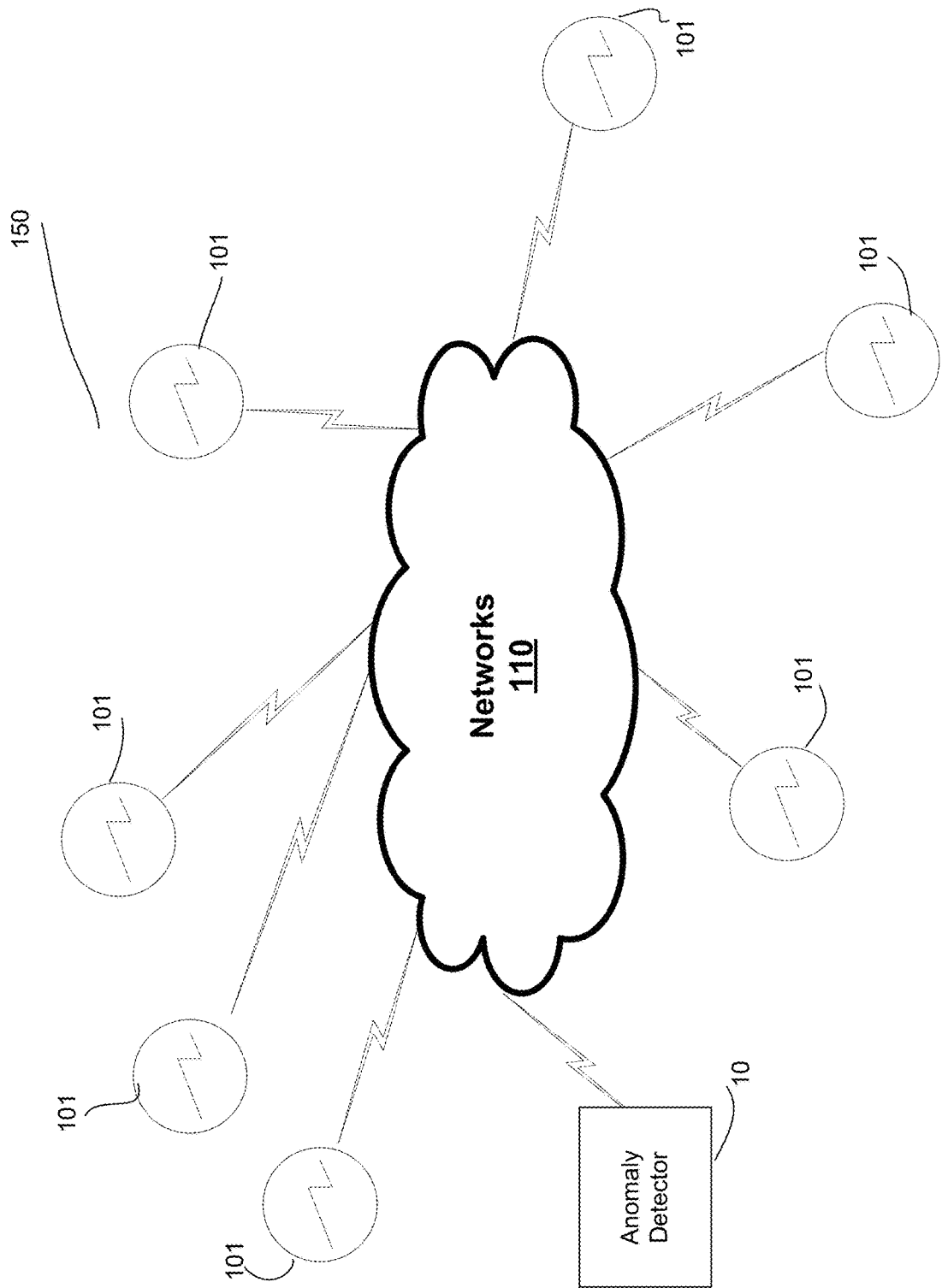
FIG. 1 is an overview diagram of elements of an anomaly detection network/system that can implement embodiments of the invention.

FIG. 1 is an overview diagram of elements of an anomaly detection network/system 150 that can implement embodiments of the invention. Sensor based network 150 includes multiple sensors 101 that form a sensor network 150 in combination with one or more networks 110. Each of sensors 101 can be considered an Internet of Things ("IoT") device with the associated processing and communication capabilities. System 150 may include a relatively large number of sensors 101 (millions or billions of sensors, for example).

An IoT device can be any device that has a sensor attached to it and can transmit data from one object to another or to people with the help of Internet. IoT devices include wireless sensors, software, actuators, and computer devices. They are attached to a particular object that operates through the internet, enabling the transfer of data among objects or people automatically without human intervention. Each of sensors 101 can include a processor/controller, and a communication interface that uses protocols such as Modbus, Zigbee, or proprietary protocols, to connect to an Edge Gateway.

Network 150 may be used for a variety of purposes, such as, for example, in the transportation industry, where vehicle fleet management is aided by the continuous acquisition of data by sensors that are attached to vehicles. In this embodiment, sensor network 150 may acquire data that may be monitored and processed for such purposes as aiding vehicle maintenance, optimizing vehicle routes, promoting driver safety, etc. As another example, sensor network 150 may be used in a smart building, where sensors 101 measure such parameters as air temperature, humidity, building occupancy, lighting, etc., for purposes of managing heating, ventilation, air conditioning and lighting systems and optimizing the use of resources, such as electricity, gas and water. As yet another example, sensor network 150 may be used in a utility infrastructure, where sensors 101 acquire data that monitor power, water, and so forth for efficient resource management.

Each of sensors 101 communicate, wirelessly or wired, through one or more networks 110. Networks 110 include the Internet, but may also include private on-premise networks that ultimately interface with the Internet as well as any other type of network that allows sensors 101 to communicate. Network 150 in general is a multi-sensor environment in that each asset to be monitored is monitored by two or more sensors. For example, an asset can be monitored simultaneously by both by a temperature sensor, a pressure sensor and a wear sensor.

Monitored assets can be found, for example, in the area of manufacturing, facilities management, mining, hospitals, or any other industry where assets are critical. In facilities, monitored assets may include HVAC systems, forklifts, office equipment such as copiers, or high value machinery. In manufacturing, monitored assets may include lathes, boilers, extruders, milling, drilling, and shaping machines. In hospitals, monitored assets may include patient beds, ultrasound machines, medicine storage, and blood infusion pumps. In mining, monitored assets may include excavators, loaders, dumpers, drag lines, shovels, rigs, and generators.

An anomaly detector 10 is coupled to networks 110 to send and receive data from sensors 101. Anomaly detector 10 provides the anomaly detection functionality disclosed herein. In general, anomaly detector 10 monitors data acquired by each of sensors 101 for purposes of detecting outliers, or anomalies, in that sensor's data. A given sensor 101 may provide anomalous data due to errant operation of the sensor such as from the failure of a sensor 101, the impending failure of a sensor 101, an errant operation of a sensor 101 due to for example, a misconfiguration or malicious activity, when a condition (e.g., temperature) exceeds a predetermined threshold, etc.

Sensors 101 can be largely dispersed geographically, such as with temperature sensors located throughout the world, or more locally dispersed. For example, a machine can be fitted with sensors 101 to monitor its operation. These sensors measure quantities such as temperature, pressure, and vibration amplitude for the different parts of the machine. If there is some malfunction or any other abnormality, some of these readings will deviate significantly from the norm. For example, it may be the case that a small part of the engine is overheated when compared to the rest of the engine, or that the entire engine is overheated when compared to the rest of the machine.

Figure 2:
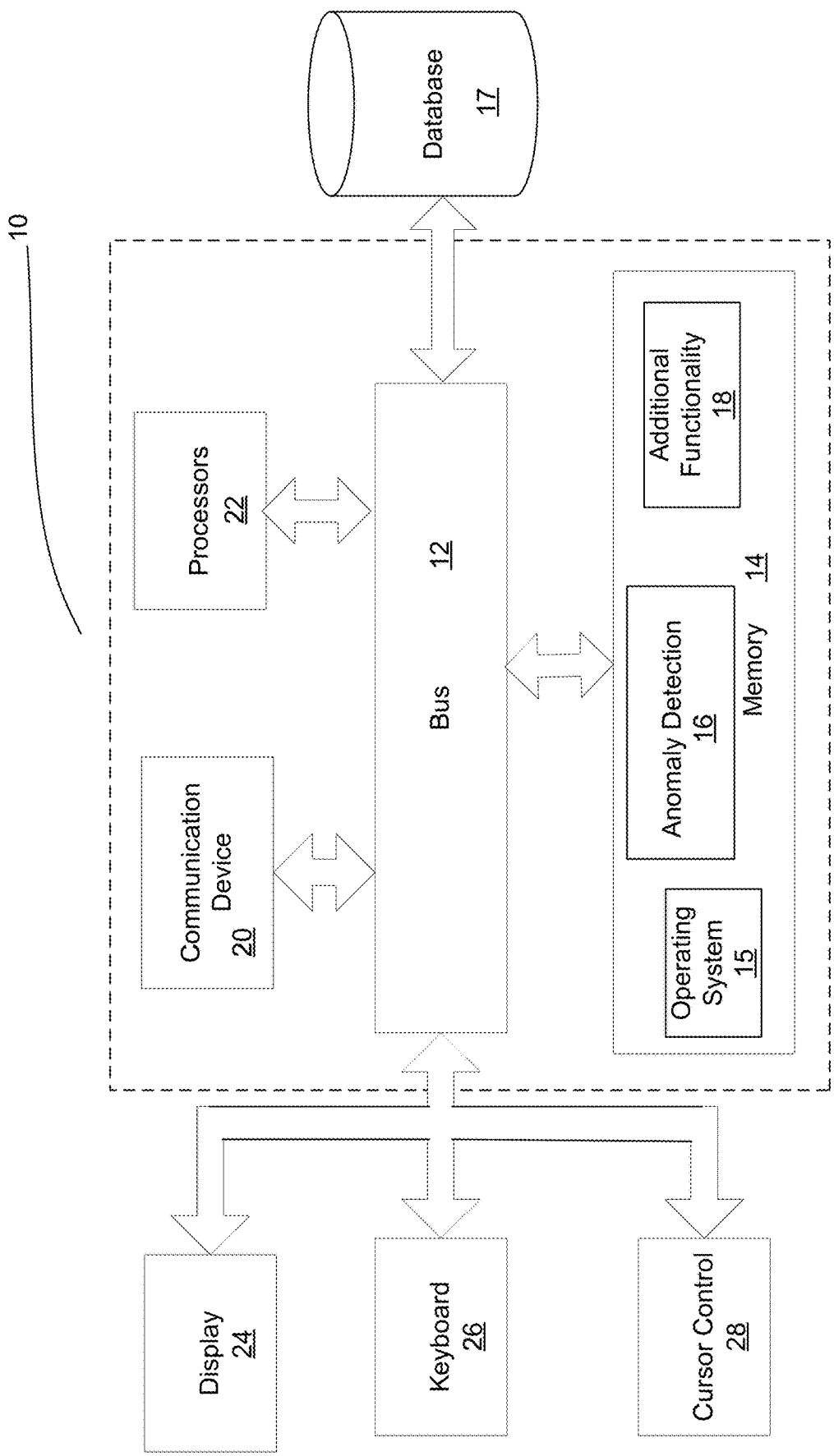
FIG. 2 is a block diagram of the anomaly detector of FIG. 1 in the form of a computer server/system in accordance with an embodiment of the present invention.

FIG. 2 is a block diagram of anomaly detector 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an anomaly detection module 16 that detects anomalies in a network of sensors that uses multiple sensors for a monitored asset, and all other functionality disclosed herein. System 10 can be part of a larger system. Therefore, system 10 can include one or more additional functional modules 18 to include the additional functionality, such as the "IoT Asset Monitoring Cloud Service" from Oracle Corp. A file storage device or database 17 is coupled to bus 12 to provide centralized storage for modules 16 and 18, including data generated by the sensors in the form of messages or data points. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

As discussed, in the IoT environment, advances in processor technologies and wireless communications have enabled the deployment of small, low cost and power efficient sensors. Anomaly detection involves monitoring the physical environment and highlighting events of interest as well as detecting problems in the sensor network. However, IoT sensors have limited resource capabilities, and the large amount of incoming different streams of data needs to be examined dynamically.

Embodiments, in general, use a flexible data distribution approximation framework that does not require a priori knowledge about the input distribution. Based on the data distribution, embodiments efficiently provide deviation detection in sensor network 150 through determining a threshold and an evaluation window (i.e., for the identified threshold, how many minimum points should be used when identifying anomalies at runtime).

Embodiments determine the threshold used to filter out anomalies in an IoT system involving multiple sensors. Anomalies are expected to be different from normal data points. In the process of identifying abnormal behavior for time series data coming from multiple sensors with varying probability distribution, embodiments identify the threshold value, which is defined as the accepted difference between normal and abnormal behavior of the asset, as represented by the probability density using JS divergence. If the JS divergence value of incoming data is more than the estimated threshold, those sets of events/time-period on which this event occurred can be identified as anomalous sets of events.

In embodiments, using the identified threshold, an asset with multiple sensor is monitored for change in the distribution of the data from sensors and anomalies are reported in an automatic way.

Embodiments use a non-parametric kernel density approach to estimate the probability density function ("PDF") of the asset failures. Probability density is the relationship between observations and their probability and is summarized by PDF. For a univariate (i.e., single sensor) case this implies a single row instance with a variable with value (v(i)) with its probability of occurrence. For a multivariate (N variable) case (i.e., multiple sensors per asset) this implies a single row instance and the probability that those values co-exist.

Table 1 below provides some example sensor readings (e.g., a reading every 5 seconds) from multiple sensors (i.e., a temperature sensor and a pressure sensor) that monitor an asset (e.g., an engine block) and the corresponding probability that the combination could exist. As shown, the sensed readings are fairly consistent until the final reading of a very high temperature and relatively normal pressure of 100/10, which has a relatively low probability of occurrence of 0.01. These readings would be identified as an anomaly, meaning either the temperature is too high, or the sensor is outputting bad data.

TABLE 1

| Temperature | Pressure | Probability |
|---|---|---|
| 10 | 20 | .2 |
| 10 | 25 | .4 |
| 12 | 22 | .25 |
| . | . | . |
| . | . | . |
| . | . | . |
| 100 | 10 | .01 |

The calculated probability of Table 1 is estimated from the given data set using non-parametric density estimate by approximating a kernel over the data set. The kernel effectively smooths the probabilities across the range of outcomes for a random variable such that the sum of probabilities equals one. A maximum likelihood estimation ("MLE") framework ensures the best estimation (i.e., maximizing probability for events) for a given kernel.

Embodiments use probability distribution in a multivariate environment in order to maximize the probability for a likely event. For an unlikely event, these probabilities are expected to be low. The density estimate does not consider the latent relationship among variables. In multivariate case, a single PDF is used for determining whether an observation is likely or unlikely.

In general, embodiments identify anomalies on time series data generated by each of sensors 101 for a multisensor environment (i.e., two or more sensors per monitored asset). Discovering a normal pattern in an IoT system involving multiple sensors means providing scores to each data point and identifying a threshold above which the patterns are considered anomalous. Embodiments identify/quantify the threshold using probability density estimates and JS divergence to identify an anomalous window.

Figure 3:
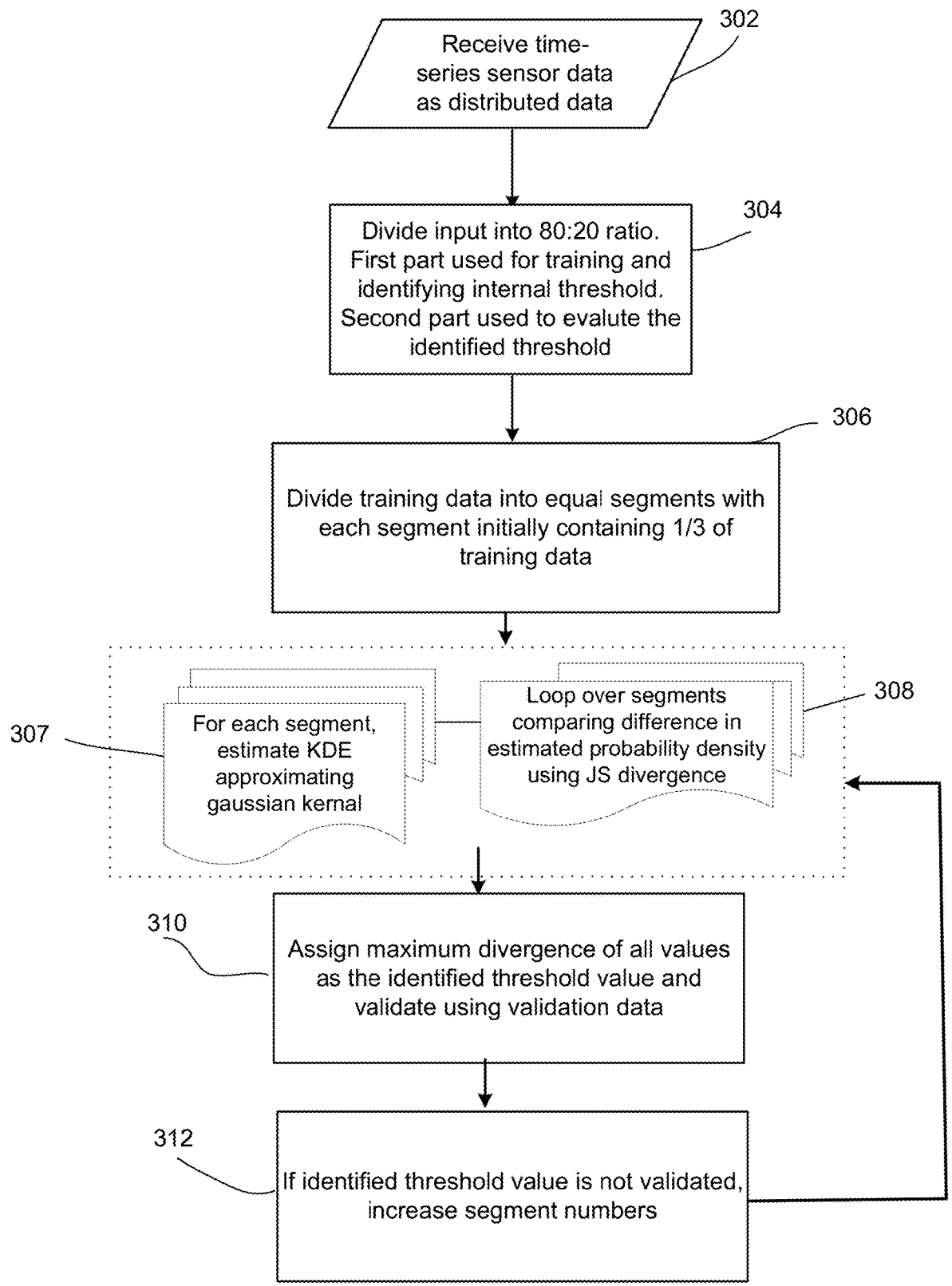
FIG. 3 is a flow diagram of the functionality of the anomaly detection module of FIG. 2 for determining a threshold when detecting anomalies in a sensor network in accordance with one embodiment.

FIG. 3 is a flow diagram of the functionality of anomaly detection module 16 of FIG. 2 for determining a threshold when detecting anomalies in a sensor network in accordance with one embodiment. The functionality disclosed herein is for a multi-sensor environment. In one embodiment, the functionality of the flow diagram of FIG. 3 (and FIGS. 4 and 5 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, the data is received from sensors 101. The data is time-series data in the form of messages or data points that are sent on a fixed time schedule from each sensor 101, although different sensors have different frequencies at which the messages are sent. For example, each sensor can send a data point every minute or every hour. In one embodiment, a single sensor 101 generates a data point/message every 10 seconds, so over a four day period 34,560 points will be generated. For example, if one of sensors 101 is a temperature sensors, it is generating data points that represent temperature, and a new temperature reading is generated every 10 seconds which causes an associated message to be sent from that sensor.

In general, at 302 sensor readings are received from various different sensors, monitoring the same asset, that are operating under different frequencies. For example, sensor 1 emits data every minute and sensor 2 emits data every hour. In this example, it would be expected in 2 hours to receive 120 readings from sensor 1 and 2 readings from sensor 2. Embodiments, in particular, need to consider the sensor with the least frequency and have the other sensors repeat the last known values, in order to augment the data, as disclosed below. Further, embodiments can incorporate "metrics" which is a formula based combination of two or more sensors.

In embodiments, each asset can include an "asset type" that defines the various attributes that identify the asset, and include the sensor attributes that can be associated with the asset. A forklift asset type, for example, may include sensors for GPS coordinates, temperature, vibration, and oil viscosity. In embodiments, an "entity" can be associated with each asset type. Entities, and corresponding entity ID can include metrics, actions, rules, trends, anomalies, predictions and external data associations.

For example, consider for a monitored asset entity Id's id1 and id2 and id3. Sensor values and Metric values are applicable to each entity. The below tables include entries for multiple entities, and each entity can have multiple sensors, and generally is of the same type (e.g., a forklift or an engine).

Consider a sequence of sensor and metric data at different time intervals as below.

| eventTime | entityId | type | value |
|---|---|---|---|
| 10 | id1 | metric | m1 |
| 20 | id2 | sensor | s1 |
| 30 | id1 | sensor | s2 |
| 40 | id1 | metric | m2 |
| 50 | id2 | sensor | s3 |
| 60 | id1 | metric | m3 |
| 70 | id3 | metric | m4 |
| 80 | id1 | sensor | s5 |
| 90 | id2 | sensor | s6 |

Embodiments first pivot the values by differentiating them as sensor and metric values as follows:

| eventTime | entityId | metrics | sensors |
|---|---|---|---|
| 10 | id1 | m1 | null |
| 20 | id2 | null | s1 |
| 30 | id1 | null | s2 |
| 40 | id1 | m2 | null |
| 50 | id2 | null | s3 |
| 60 | id1 | m3 | null |
| 70 | id3 | m4 | null |
| 80 | id1 | null | s5 |
| 90 | id2 | null | s6 |

Embodiments then join these using window functions to populate NULL metrics or sensor values with the last known property value for an entity as follows:

| eventTime | entityId | metrics | sensors |
|---|---|---|---|
| 10 | id1 | m1 | null |
| 30 | id1 | m1 | s2 |
| 40 | id1 | m2 | s2 |
| 60 | id1 | m3 | s2 |
| 80 | id1 | m3 | s5 |
| 20 | id2 | null | s1 |
| 50 | id2 | null | s3 |
| 90 | id2 | null | s6 |
| 70 | id3 | m4 | null |

Finally, in real use cases a time window [startTime, endTime] will be given for aggregation. Embodiments will slice it by time range and union with last known values prior the time range, which can generate the need for a complex query with multiple nest conditions. For example, for the data above, use the time window [40, 70] as follows:

| eventTime | entityId | metrics | sensors |
|---|---|---|---|
| 40 | id1 | m2 | s2 |
| 60 | id1 | m3 | s2 |
| 40 | id2 | null | s1 |
| 50 | id2 | null | s3 |
| 70 | id3 | m4 | null |

Figure 6:
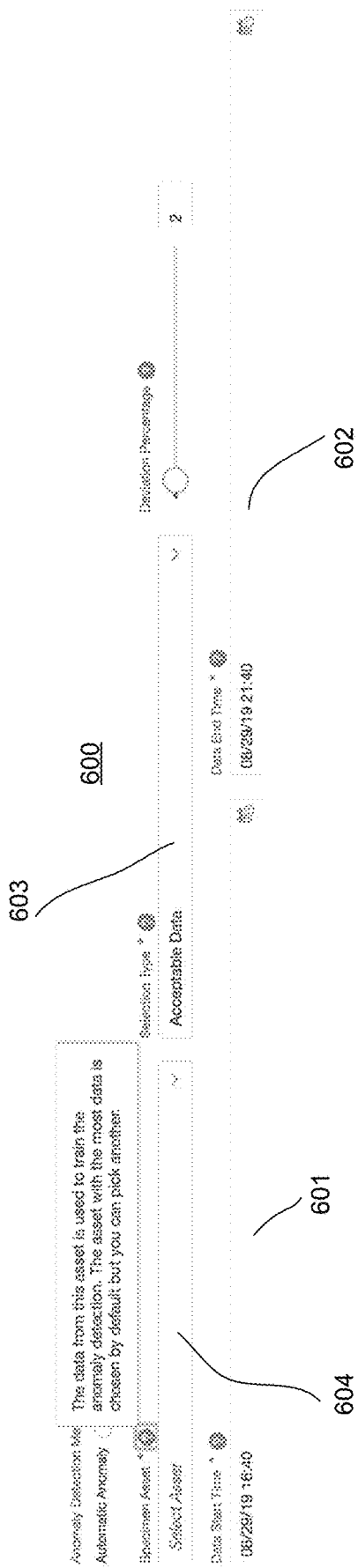
FIG. 6 illustrates a screenshot of a user interface for receiving data in accordance with embodiments.

It is assumed in embodiments that the input data at 302 is anomaly free data, in general, meaning that all of the data points reflect the expected behavior of the respective sensor and asset monitored by each sensor, and does not include any unexpected behavior. In embodiments, a user interface ("UI") is provided to allow a user to specify the input data. FIG. 6 illustrates a screenshot of a user interface 600 for receiving data at 302 in accordance with embodiments. At 604, the asset, and corresponding two or more sensors that are monitoring the asset, is selected. At 603, the type of data is selected, which for 302 is "acceptable data" (i.e., anomaly-free data) because it is assumed that the sensor is behaving properly during this timeframe. At 601 and 602, the start time and end time of the collected data is specified. For example, four days of anomaly-free data from a temperature and pressure sensor can be specified on UI 600.

At 304, the data points are divided into an 80:20 ratio, or some other predetermined ratio. The 80% of the data ("training data") is used to calculate the threshold value. The remaining 20% of the data ("evaluation data") is used to evaluate the calculated threshold value, as disclosed below in conjunction with FIG. 4. In one embodiment, since the data is ordered by time, the first 80% of the data points is selected as the 80% (i.e., not randomly selected), in order to preserve the temporal aspect of the data, and the last 20% is used to determine the evaluation window. As a precondition, 10,000 samples are drawn from the 80% of the data using Monte-Carlo sampling. These samples are used to compare two different probability distributions.

In embodiments, for 304, from a given set of training points, a point is picked at random using a "bandwidth" value as the standard deviation and the selected training point as the mean. Embodiments then draw from a Gaussian distribution with the mean and standard deviation. The following pseudocode implements the functionality of 304 in one embodiment:

```
def _sample_from_gaussian(self, u, v):
    """
    Returns a random sample from a Gaussian distribution with mean u
    and variance v
    """
    if self._dimensions == 1:
        return np.random.normal(loc=u, scale=np.sqrt(v))
    else:
        if self._q_mat is None:
            eigvec, eigval = np.eig(self._bandwidth)
            self._q_mat = np.sqrt(eigval) * eigvec
        random_vector = np.random.randn(self._dimensions).reshape(-1,1)
        sample = self._q_mat * random_vector + u.reshape(-1,1)
        return sample.reshape(1,-1)
```

As disclosed below, embodiments compare two different probability distributions. To compare how different these two distributions are, embodiments try to compute the probability of occurrence of each sample in the first distribution. Embodiments then repeat the same step of computing the probability of occurrence of each sample in the second distribution. Now that there are two sets of probabilities, it is used as an input to a JS divergence computation, which results in a value which is considered to be distance between two or more distributions.

At 306, the training data, which is in temporal order, is spilt into three equal segments with each segment containing ⅓ of the training data. The number of equal segments is a hyper-parameter which can be fine-tuned depending on results on the validation data set so may be four, five, etc. equal segments in other embodiments.

At 307 and 308, embodiments iterate over each of the segments in loops, estimating probability density for each segment by approximating/estimating a KDE gaussian kernel at 307 as a mathematical curve and comparing the estimated probability distribution of each segment and computing the difference in distribution in each of the identified segment using JS divergence between each of the segments (i.e., "scoring" the input). JS divergence extends KL divergence to calculate a symmetrical score and distance measure of one probability distribution from another.

KDE is a non-parametric way to estimate the probability density function of a random variable and is efficient to compute and maintain in a streaming environment. In one embodiment, the mathematical curve for the data points that form each segment and the mathematical curve for the 80% data points that form the training data are determined using KDE at 307. The KDE for each segment is used to estimate the threshold and the KDE for the 80% of the data points is used to compare with the KDE of new incoming data to get a JS divergence score, which is compared to the estimated threshold to decide if the new data includes anomalies, or not, as disclosed below. Referring again to 307, the mathematical curve is determined using KDE for the segments and the entire 80% data points as follows:

$$\hat{f}_h(x) = \frac{1}{n}\sum_{i=1}^{n} K_h(x - x_i) = \frac{1}{nh}\sum_{i=1}^{n} K\left(\frac{x - x_i}{h}\right),$$

where K is the kernel (i.e., a non-negative function) and h>0 is a smoothing parameter referred to as the bandwidth. The kernel function used in embodiments is the following Gaussian function:

$$K(u) = \frac{1}{\sqrt{2\pi}} e^{-\frac{1}{2}x^2}$$

At 308, JS divergence is used to measure the similarity between each combination of two probability distributions of 308 (i.e., the KDE curves for each segment). Therefore, for example, for 3 segments, 6 JS divergence values are calculated, for 4 segments, 24 JS divergence values are calculated, and so on. JS divergence is a principled divergence measure which is always finite for finite random variables. It quantifies how "distinguishable" two or more distributions are from each other and is derived from the Kullback-Leibler ("KL") divergence.

Specifically, a KL divergence score quantifies how much one probability distribution differs from another probability distribution. The KL divergence between two distributions Q and P is often stated using the following notation: KL(P||Q)
Where the || operator indicates divergence of P from Q. KL divergence can be calculated as the negative sum of probability of each event in P multiplied by the log of the probability of the event in Q over the probability of the event in P as follows:

$$KL(P\|Q) = -\sum^{(x \in X)} P(x) \times \log\left(\frac{Q(x)}{P(x)}\right)$$

The intuition for the KL divergence score is that when the probability for an event from P is large, but the probability for the same event in Q is small, there is a large divergence. When the probability from P is small and the probability from Q is large, there is also a large divergence, but not as large as the first case. It can be used to measure the divergence between discrete or continuous probability distributions, where in the latter case the integral of the events is calculated instead of the sum of the probabilities of the discrete events.

Importantly, the KL divergence score is not symmetrical, for example: KL(P||Q)≠KL(Q||P).

The JS divergence is another way to quantify the difference (or similarity) between two probability distributions. It uses the KL divergence to calculate a normalised score that is symmetrical. This means that the divergence of P from Q is the same as Q from P, or stated formally:

$$JS(P\|Q) \equiv JS(Q\|P)$$

The JS divergence can be calculated as follows:

$$JS(P\|Q) = \tfrac{1}{2} \times KL(P\|M) + \tfrac{1}{2} \times KL(Q\|M)$$

Where M is calculated as:

$$M = \tfrac{1}{2} \times (P+Q)$$

KL( ) function is calculated as the KL divergence described above. It is more useful as a measure as it provides a smoothed and normalized version of KL divergence, with scores between 0 (identical) and 1 (maximally difference), when using the base-2 logarithm.

At 310, the maximum value among all the estimated JS divergence values determined at 308 will be considered the identified threshold, subject to validating of the threshold using the 20% evaluation data as disclosed below in conjunction with FIG. 4 (where if the functionality arrives at 408, the threshold value has not been validated).

At 312, if the identified value is not validated, the number of segments is increased and the functionality continues at 307, 308 with the new number of segments. In one embodiment, the number of segments are increased by dividing the segments in 0.2, 0.1 and 0.05 fractions, or until the identified threshold is validated, which then becomes the final threshold. In embodiments, the minimum number of data points required is approximately 3,000 in each segment, so a number of iterations of 312 can depend on the initial number of data points.

Figure 4:
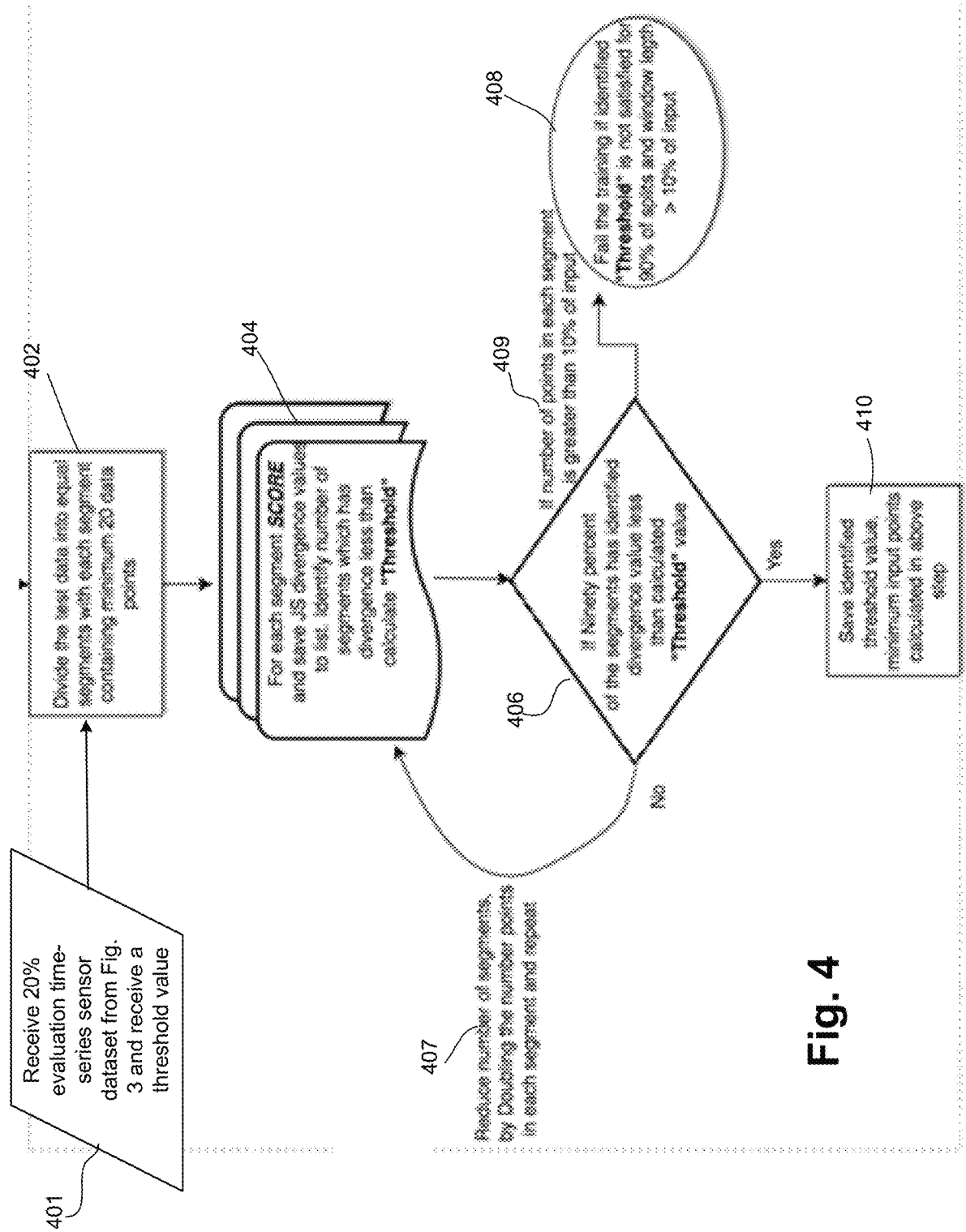
FIG. 4 is a flow diagram of the functionality of the anomaly detection module of FIG. 2 for determining a minimum window size for a specific threshold when detecting anomalies in a sensor network in accordance with one embodiment.

FIG. 4 is a flow diagram of the functionality of anomaly detection module 16 of FIG. 2 for determining a minimum window size for a specific threshold when detecting anomalies in a sensor network in accordance with one embodiment. In embodiments, the specific threshold is the threshold that is calculated using the functionality of FIG. 3. However, the threshold can be input from any other source as long as it is a KL divergence value.

Embodiments can have a preset time window for which anomalies need to be checked. For example, for a single sensor 101 that generates a data point/message every 10 seconds, the window may be two minutes. In other words, embodiments check for anomalies every two minutes. During that window, each of the multiple sensors 101 will generate 12 data points (i.e., 24 or more total data points generated during the two minutes). However, the threshold from FIG. 3 was generated from 10,000 data points in one embodiment. Embodiments will use KDE to create a curve from the 12 data points and compare the curve to the 10,000 data point KDE curve generated to determine if it is over or under the threshold. However, in this example, since 24 or greater points is substantially smaller than 10,000 points, false positives may more likely be generated. Therefore, embodiments must determine the minimum number of points in the window that are needed to be compared to the 10,000 points (i.e., the number of points used to determine the threshold) to reduce or eliminate false positives, and if the number of points is below the minimum, embodiments add "clean" points to the input points to improve anomaly detection.

Therefore, when detecting anomalies using KDE in combination with JL divergence, using the threshold value from FIG. 3 entails using a trained algorithm with large amounts of data. In contrast, in embodiments, when evaluating incoming data, and comparing the complete probability distribution function ("PDF") of training data (i.e., a large dataset) with the PDF of incoming data (i.e., a relatively very small dataset) does not always generate accurate results. Therefore, FIG. 4 functionality assists in identifying anomalies while comparing relatively small input data with a trained PDF by determining a minimum window size (i.e., a minimum number of data points in the window) and also validates the threshold that was determined in conjunction with FIG. 3.

At 401, the evaluation dataset from 304 of FIG. 3 and the threshold value is received. The evaluation dataset is formed of the 20% of the data input in 302 that was not used for determining the threshold. As with the entire initial dataset received at 302, the evaluation dataset at 401 is free of anomalies (i.e., "clean" data).

At 402, the evaluation dataset is divided into "n" equal segments, with each segment including at least 20 points each in one embodiment. However, in other embodiments any predefined number besides 20 can be used.

At 404, for each segment at 402, each segment is "scored" similar to 307 and 308 of FIG. 3 to arrive at a JS divergence value for each segment. The number of segments having a divergence value less than the threshold value is determined.

At 406, it is determined if 90% or greater of the segments have an identified JL divergence value less than the threshold value. However, in other embodiments any predefined percentage besides 90% can be used.

If no at 406, then at 407 the window size is increased. In one embodiment, the window size is increased by reducing the number of segments by doubling the number of points in each segment (i.e., increasing the window size). Functionality continues at 404.

If no at 406, and if at 409 the number of points in each segment is greater than 10% of the input, then the training fails. The training may fail, for example, if there is too much variation in the data. Consequently, a solution may be to try again with more data (e.g., wait a few days to collect additional samples). In embodiments, having greater than 10,000 points is typically required to provide adequate results.

If yes at 406, then at 410 the threshold value from FIG. 3 (or the received threshold value from another source), and the minimum number of input points is saved. The final number of points are considered as the minimum input points required in incoming input while scoring. Further, in embodiments, while scoring if the input size is less than minimum, the saved points are added to the input and then the complete window is scored as described below. This does not disturb the distribution as the points that are saved are from the anomalous free data and is expected to be normal in the distribution.

As an example of the functionality of FIG. 4, if the evaluation dataset has 500 points, the input is divided into 25 segments that include 20 points each. Then each segment is scored and each score returns a JL divergence value. From the list of 25 JL divergence values, if 90% of values (i.e., 23 in this example) has an identified divergence less than the calculated "Threshold", the minimum window size is considered to be 20. If it does not satisfy the 90% criteria, the number of points is doubled for each segment. Therefore, in this example, the 500 points are divided into 13 segments approximately with 40 points each and the same evaluation step is repeated.

Figure 5:
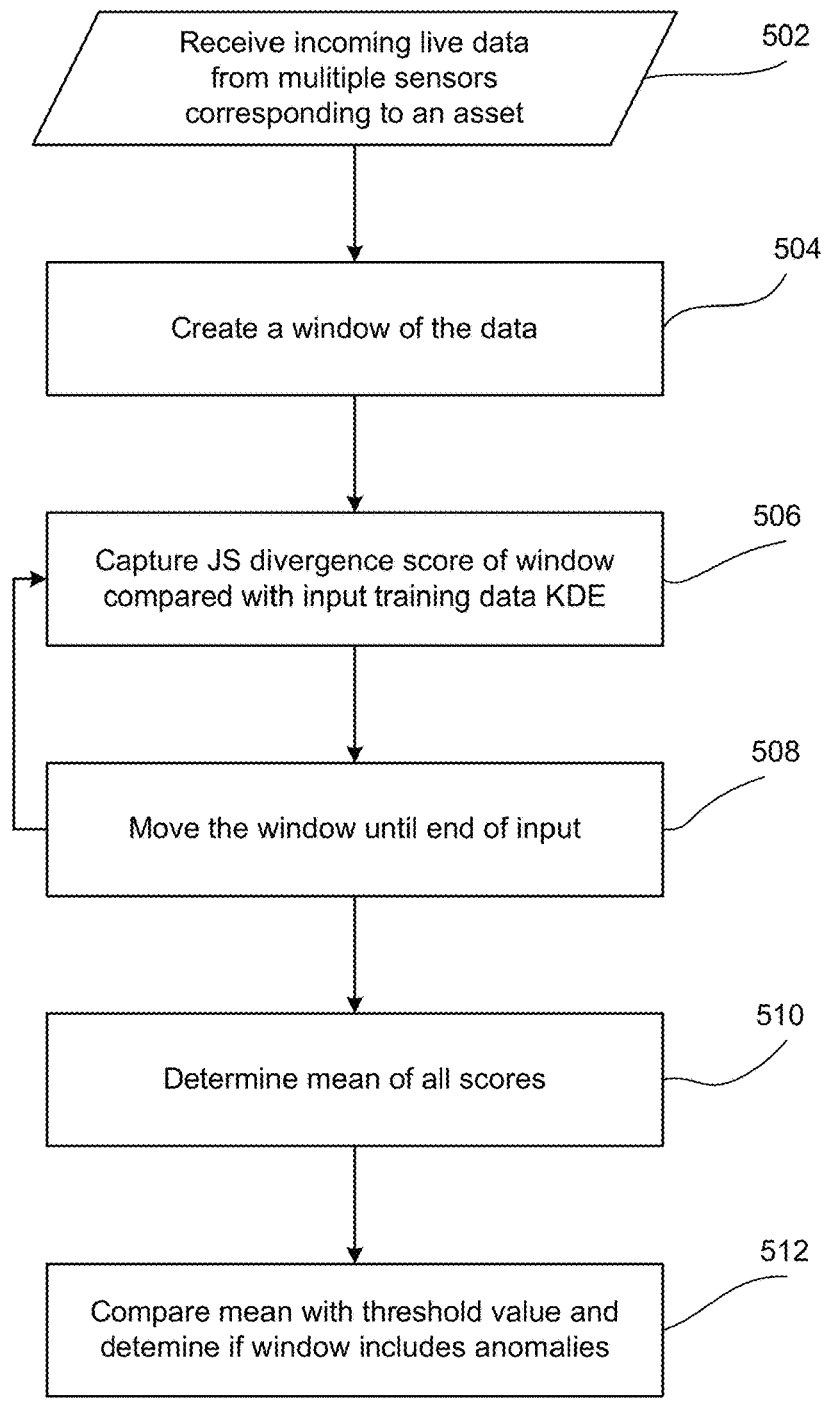
FIG. 5 is a flow diagram of the functionality of the anomaly detection module of FIG. 2 for determining anomalies in live data (i.e., scoring the data) after the functionality of FIG. 3 and/or FIG. 4 has been completed in accordance with one embodiment.

FIG. 5 is a flow diagram of the functionality of anomaly detection module 16 of FIG. 2 for determining anomalies in live data (i.e., scoring the data) after the functionality of FIG. 3 and/or FIG. 4 has been completed in accordance with one embodiment. The functionality of FIG. 5 is repeated for a pre-defined time window of data points generated by multiple sensors 101 that correspond to an asset. For example, a two minute time window.

Before scoring the input using the functionality of FIG. 5, minimum input conditions need to be met. Specifically, if the frequency is too low, repeat the input multiple times so that anomalous data cannot be missed, in case of low frequency output of each of the sensors. Add the saved points to input, and make sure minimum input size condition from FIG. 4 is satisfied.

At 502, evaluation on live data (i.e., at runtime) is started. In embodiments, each of sensors 101 generates live data in the form of a stream of messages. As described above, since different sensors may generate data at different frequencies, "snapshots" of the data may be used, which may be a fixed timeframe of data.

At 504, a window of the incoming data is created having a length L and being moved by a length W (i.e., a sliding window). The window length L is initially considered as ⅓ of the input data. The sliding window length W is ½ of the window length. Other values of L and W can be used in other embodiments.

At 506, the JS divergence score of the window is determined by comparing, using JS divergence, a KDE curve of the window with the input training data KDE (from 307, 308) (i.e., the KDE of the entire data set or of the training data formed at 304).

At 508, the window is moved by length L and 506 is repeated until all of the input is compared. For every iteration, keep track of number of times particular instance is compared, increment every time instance is processed. For every iteration, keep appending to the list which includes the JS divergence value of that particular iteration.

At 510, the mean of all scores generated at 506 is determined.

At 512, the mean is compared with the threshold determined in FIG. 3. if the mean is greater than the threshold value, then the current input window includes anomalies. The anomalous window and the individual sensor readings is then provided in a report. In some embodiments, a particular sensor of the multiple sensors that may have an out of threshold reading may be automatically determined. In other embodiments, it is enough to determine that the specific window is anomalous and the individual sensor readings can then be examined.

Figure 7A:
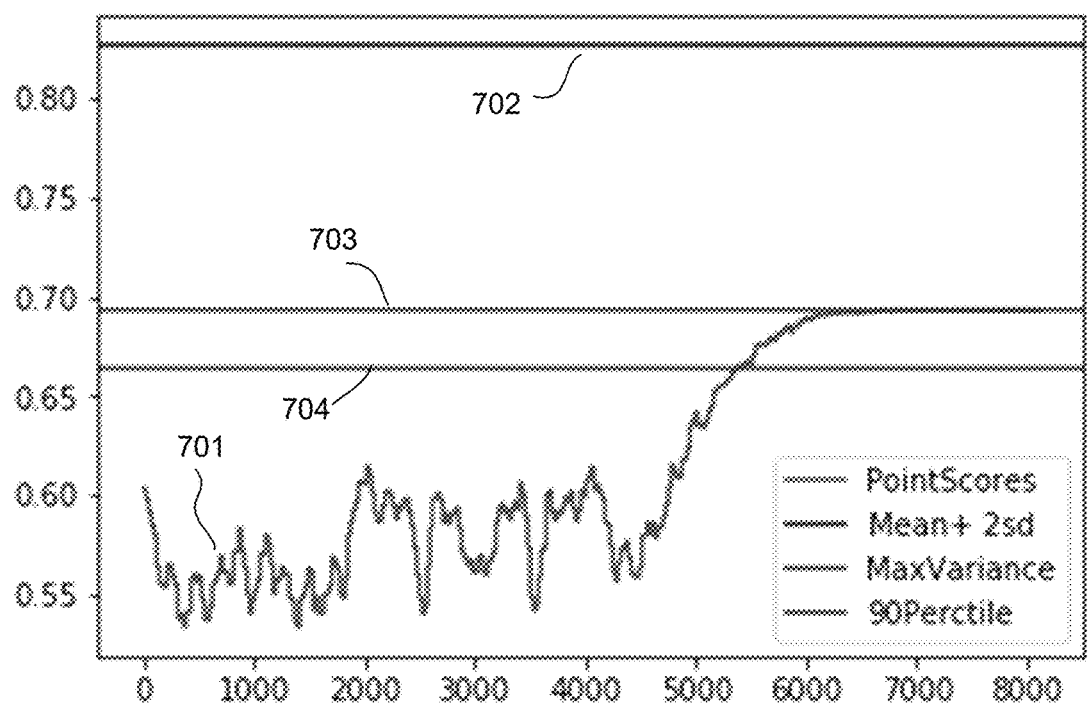
FIGS. 7A and 7B illustrate example JS divergence plots for multiple sensors in accordance to embodiments of the invention.
Figure 7B:
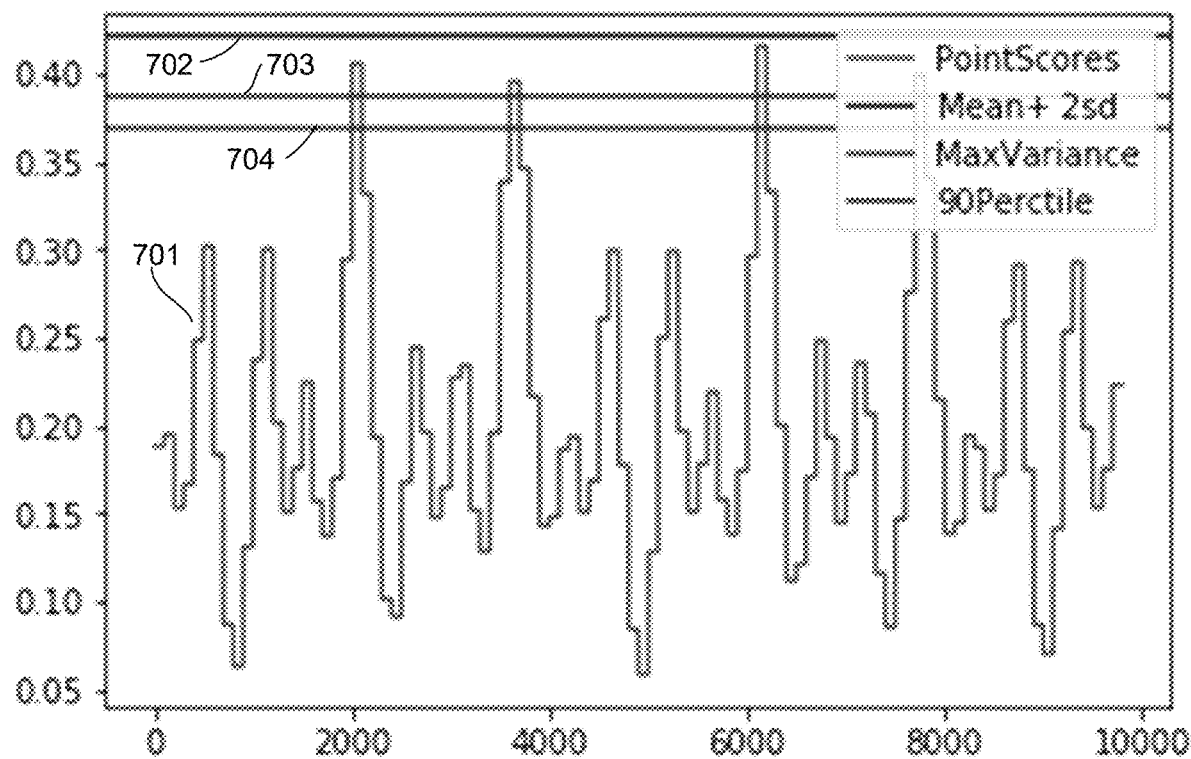

FIGS. 7A and 7B illustrate example JS divergence plots for multiple sensors in accordance to embodiments of the invention. Each plot incudes the point scores 701, mean plus two standard deviations 702, maximum JS variance 703 and $90^{th}$ percentile 704. FIG. 7A is for three sensors, and FIG. 7B is for ten sensors. In general, the mean plus two standard deviations 702 is expected to overshoot the target and may miss many anomalies. The maximum JS variance 703 therefore provides a good estimate for the anomaly threshold.

FIGS. 7A and 7B provides a visual example of the functionality of 307 and 307 when comparing and calculating JS divergence using all combination of segments. Once the JS divergence is obtained for all combinations, embodiments choose the maximum JS divergence.

As disclosed, anomalies are determined based on the JS divergence values between the "normal" and "evaluation" data densities. If the divergence is beyond a calculated threshold value, the window of evaluation data is labeled as anomalous. As such, setting a proper threshold value is critical.

When dealing with different industries, each industry system can having multiple sensors monitoring a single process. The data distribution from any of these processes does not follow any regular data distribution and can have sensor messages giving out data at different frequencies. Embodiments help in identifying anomalies in these cases.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of determining anomalies in sensor data generated by a plurality of sensors that correspond to a single asset, the method comprising:
   receiving a first time window of clean sensor input data generated by the sensors, the clean sensor input data comprising anomaly free data comprised of clean data points;
   dividing the clean data points into training data points and evaluation data points;
   dividing the training data points into a pre-defined number of plurality of segments of equal length;
   converting each of the plurality of segments into corresponding segment curves using Kernel Density Estimation (KDE);
   determining a Jensen-Shannon (JS) divergence value for each of the plurality of segments using the segment curves to generate a plurality of JS divergence values;
   assigning a maximum value of the plurality of JS divergence values as a threshold value; and
   validating the threshold value using the evaluation data points.

2. The method of claim 1, further comprising:
   when the threshold value is not validated, increasing the number of plurality of segments of equal length and then repeating the converting, the determining the JS divergence value, the assigning and the validating; and
   when the threshold value is validated, using the validated threshold value to determine anomalies in live data.

3. The method of claim 1, further comprising:
   receiving an input window of live sensor data comprising input data points generated by multiple sensors corresponding to a single asset;
   creating a second time window from the input window, the second time window comprising a window length and a sliding length;
   converting the first time window into a corresponding first curve using KDE;
   converting the second time window into a corresponding second curve using KDE;
   determining a second JS divergence value between the second curve and the corresponding curve of the first time window;
   moving the second time window by the window length;
   repeating, for the moved second time window, the converting the second time window and the determining the second JS divergence value until all of the input window is converted into the corresponding second curve to generate multiple second JS divergence values;
   determining a mean of the multiple second JS divergence values; and
   comparing the mean to the threshold value to determine when the input window includes anomalies.

4. The method of claim 1, further comprising:
   (a) dividing the evaluation data points into a plurality of evaluation segments of equal length, wherein each equal length comprises a minimum number of data points;
   (b) converting each of the plurality of evaluation segments into corresponding evaluation curves using KDE;
   (c) for each of the plurality of evaluation segments, determining an evaluation JS divergence to generate a plurality of evaluation JS divergence values;
   (d) determining an amount of the plurality of evaluation segments that have a JS divergence value less than the threshold value; and
   (e) when the amount is less than a pre-defined percentage of the plurality of evaluation segments, reducing a number of evaluation segments to increase a number of evaluation data points in each segment, and for the reduced number of evaluation segments, repeating (c)-(e).

5. The method of claim 4, further comprising:
   when the amount is greater than the pre-defined percentage of the plurality of evaluation segments, then a current size of each evaluation segment is a minimum window size for determining anomalies in sensor data generated by the sensors, the minimum window size comprising a minimum data points for the threshold value.

6. The method of claim 4, further comprising:
   when the amount is less than a pre-defined percentage of the plurality of evaluation segments, and a current number of data points in each segment is greater than a pre-defined percentage of the plurality of data points, then the validating the threshold value has failed.

7. The method of claim 1, wherein each of the sensors comprise an Internet of Things device.

8. A non-transitory computer-readable medium storing instructions which, when executed by at least one of a plurality of processors, cause the processors to determine anomalies in sensor data generated by a plurality of sensors that correspond to a single asset, the determining anomalies comprising:
   receiving a first time window of clean sensor input data generated by the sensors, the clean sensor input data comprising anomaly free data comprised of clean data points;
   dividing the clean data points into training data points and evaluation data points;
   dividing the training data points into a pre-defined number of plurality of segments of equal length;
   converting each of the plurality of segments into corresponding segment curves using Kernel Density Estimation (KDE);

determining a Jensen-Shannon (JS) divergence value for each of the plurality of segments using the segment curves to generate a plurality of JS divergence values;

assigning a maximum value of the plurality of JS divergence values as a threshold value; and validating the threshold value using the evaluation data points.

9. The computer-readable medium of claim 8, the determining anomalies further comprising:

when the threshold value is not validated, increasing the number of plurality of segments of equal length and then repeating the converting, the determining the JS divergence value, the assigning and the validating; and when the threshold value is validated, using the validated threshold value to determine anomalies in live data.

10. The computer-readable medium of claim 8, the determining anomalies further comprising:

receiving an input window of live sensor data comprising input data points generated by multiple sensors corresponding to a single asset;

creating a second time window from the input window, the second time window comprising a window length and a sliding length;

converting the first time window into a corresponding first curve using KDE;

converting the second time window into a corresponding second curve using KDE;

determining a second JS divergence value between the second curve and the corresponding curve of the first time window;

moving the second time window by the window length;

repeating, for the moved second time window, the converting the second time window and the determining the second JS divergence value until all of the input window is converted into the corresponding second curve to generate multiple second JS divergence values;

determining a mean of the multiple second JS divergence values; and comparing the mean to the threshold value to determine when the input window includes anomalies.

11. The computer-readable medium of claim 8, the determining anomalies further comprising:

(a) dividing the evaluation data points into a plurality of evaluation segments of equal length, wherein each equal length comprises a minimum number of data points;

(b) converting each of the plurality of evaluation segments into corresponding evaluation curves using KDE;

(c) for each of the plurality of evaluation segments, determining an evaluation JS divergence to generate a plurality of evaluation JS divergence values;

(d) determining an amount of the plurality of evaluation segments that have a JS divergence value less than the threshold value; and (e) when the amount is less than a pre-defined percentage of the plurality of evaluation segments, reducing a number of evaluation segments to increase a number of evaluation data points in each segment, and for the reduced number of evaluation segments, repeating (c)-(e).

12. The computer-readable medium of claim 11, the determining anomalies further comprising:

when the amount is greater than the pre-defined percentage of the plurality of evaluation segments, then a current size of each evaluation segment is a minimum window size for determining anomalies in sensor data generated by the sensors, the minimum window size comprising a minimum data points for the threshold value.

13. The computer-readable medium of claim 11, the determining anomalies further comprising:

when the amount is less than a pre-defined percentage of the plurality of evaluation segments, and a current number of data points in each segment is greater than a pre-defined percentage of the plurality of data points, then the validating the threshold value has failed.

14. The computer-readable medium of claim 8, wherein each of the sensors comprise an Internet of Things device.

15. A sensor network comprising:

a plurality of sensors that correspond to a single asset and adapted to generate sensor data; and an anomaly detector coupled to the plurality of sensors via a communication network and comprising one or more processors that determine, for each of the plurality of sensors, anomalies in the sensor data, the anomaly detector adapted to:

receive a first time window of clean sensor input data generated by the sensors, the clean sensor input data comprising anomaly free data comprised of clean data points;

divide the clean data points into training data points and evaluation data points;

divide the training data points into a pre-defined number of plurality of segments of equal length;

convert each of the plurality of segments into corresponding segment curves using Kernel Density Estimation (KDE);

determine a Jensen-Shannon (JS) divergence value for each of the plurality of segments using the segment curves to generate a plurality of JS divergence values;

assign a maximum value of the plurality of JS divergence values as a threshold value; and validate the threshold value using the evaluation data points.

16. The sensor network of claim 15, the anomaly detector further adapted to:

when the threshold value is not validated, increase the number of plurality of segments of equal length and then repeating the converting, the determining the JS divergence value, the assigning and the validating; and when the threshold value is validated, use the validated threshold value to determine anomalies in live data.

17. The sensor network of claim 15, the anomaly detector further adapted to:

receive an input window of live sensor data comprising input data points generated by multiple sensors corresponding to a single asset;

create a second time window from the input window, the second time window comprising a window length and a sliding length;

convert the first time window into a corresponding first curve using KDE;

convert the second time window into a corresponding second curve using KDE;

determine a second JS divergence value between the second curve and the corresponding curve of the first time window;

move the second time window by the window length;

repeat, for the moved second time window, the converting the second time window and the determining the second JS divergence value until all of the input window is converted into the corresponding second curve to generate multiple second JS divergence values;

determine a mean of the multiple second JS divergence values; and compare the mean to the threshold value to determine when the input window includes anomalies.

18. The sensor network of claim 15, the anomaly detector further adapted to:
  (a) divide the evaluation data points into a plurality of evaluation segments of equal length, wherein each equal length comprises a minimum number of data points;
  (b) convert each of the plurality of evaluation segments into corresponding evaluation curves using KDE;
  (c) for each of the plurality of evaluation segments, determine an evaluation JS divergence to generate a plurality of evaluation JS divergence values;
  (d) determine an amount of the plurality of evaluation segments that have a JS divergence value less than the threshold value; and
  (e) when the amount is less than a pre-defined percentage of the plurality of evaluation segments, reduce a number of evaluation segments to increase a number of evaluation data points in each segment, and for the reduced number of evaluation segments, repeating (c)-(e).

19. The sensor network of claim 18, the anomaly detector further adapted to:
  when the amount is greater than the pre-defined percentage of the plurality of evaluation segments, then a current size of each evaluation segment is a minimum window size for determining anomalies in sensor data generated by the sensors, the minimum window size comprising a minimum data points for the threshold value.

20. The sensor network of claim 18, the anomaly detector further adapted to:
  when the amount is less than a pre-defined percentage of the plurality of evaluation segments, and a current number of data points in each segment is greater than a pre-defined percentage of the plurality of data points, then the validating the threshold value has failed.

* * * * *

UNITED STATES PATENT AND TRADEMARK OFFICE
CERTIFICATE OF CORRECTION

PATENT NO. : 11,216,247 B2
APPLICATION NO. : 16/806275
DATED : January 4, 2022
INVENTOR(S) : Vaid et al.

It is certified that error appears in the above-identified patent and that said Letters Patent is hereby corrected as shown below:

In the Drawings

On sheet 3 of 7, in FIG. 3, under Reference Numeral 304, Line 4, delete "evalute" and insert -- evaluate --, therefor.

On sheet 3 of 7, in FIG. 3, under Reference Numeral 307, Line 4, delete "kernal" and insert -- kernel --, therefor.

On sheet 5 of 7, in FIG. 5, under Reference Numeral 502, Line 2, delete "mulitiple" and insert -- multiple --, therefor.

On sheet 5 of 7, in FIG. 5, under Reference Numeral 512, Line 2, delete "detemine" and insert -- determine --, therefor.

Signed and Sealed this
Twenty-fourth Day of May, 2022

Katherine Kelly Vidal
*Director of the United States Patent and Trademark Office*